(12) United States Patent
Horley et al.

(10) Patent No.: US 8,099,635 B2
(45) Date of Patent: Jan. 17, 2012

(54) TECHNIQUES FOR GENERATING A TRACE STREAM FOR A DATA PROCESSING APPARATUS

(75) Inventors: John Michael Horley, Cambridge (GB); Andrew Brookfield Swaine, Cambridge (GB); Thomas Sean Houlihane, Bassingbourne (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 12/923,734

(22) Filed: Oct. 6, 2010

(65) Prior Publication Data

US 2011/0029823 A1 Feb. 3, 2011

Related U.S. Application Data

(63) Continuation of application No. 12/071,748, filed on Feb. 26, 2008.

(30) Foreign Application Priority Data

Mar. 21, 2007 (GB) .................................. 0705430.7

(51) Int. Cl.
*G06F 11/25* (2006.01)
(52) U.S. Cl. .......................... 714/45; 712/227; 717/128
(58) Field of Classification Search .................... 714/45; 712/227; 717/128
See application file for complete search history.

(56) References Cited

U.S. PATENT DOCUMENTS

| | | | |
|---|---|---|---|
| 6,154,857 A | 11/2000 | Mann | |
| 6,314,530 B1 | 11/2001 | Mann | |
| 6,415,409 B1 | 7/2002 | Rhodes et al. | |
| 6,928,639 B2 | 8/2005 | Juan et al. | |
| 2001/0011360 A1* | 8/2001 | Shigeta | 714/724 |
| 2001/0051866 A1* | 12/2001 | Ishii | 703/28 |
| 2003/0018929 A1* | 1/2003 | Bardsley et al. | 714/39 |
| 2004/0216092 A1 | 10/2004 | Ayers et al. | |
| 2004/0243662 A1 | 12/2004 | Mastro | |
| 2004/0249623 A1 | 12/2004 | Selvidge et al. | |
| 2006/0195311 A1 | 8/2006 | Swoboda et al. | |

FOREIGN PATENT DOCUMENTS

| | | |
|---|---|---|
| JP | 4-239343 | 8/1992 |
| JP | 7-64826 | 3/1995 |
| JP | 2000-259449 | 9/2000 |
| JP | 2003-263340 | 9/2003 |

OTHER PUBLICATIONS

European Search Report for GB0705430.7 dated Jul. 23, 2007.
Translation of Japanese Official Action mailed Oct. 28, 2011 in JP 2008-071114.

* cited by examiner

*Primary Examiner* — Scott Baderman
*Assistant Examiner* — Chae Ko
(74) *Attorney, Agent, or Firm* — Nixon & Vanderhye P.C.

(57) ABSTRACT

A data processing apparatus and method are provided for generating a trace stream. The data processing apparatus comprises logic for producing data elements, and trace logic for producing a stream of trace elements representative of at least some of the data elements. The trace logic has trace generation logic operable to generate trace elements for inclusion in the stream, and is further arranged to generate trace timing indicators for inclusion in the stream. Each trace timing indicator indicates the elapse of one or more processing timing intervals, the processing timing interval being a predetermined plurality of clock cycles.

21 Claims, 8 Drawing Sheets

TECHNIQUES FOR GENERATING A TRACE STREAM FOR A DATA PROCESSING APPARATUS

This application is a Continuation of application Ser. No. 12/071,748, filed Feb. 26, 2008, which claims priority to GB application No. 0705430.7 filed Mar. 21, 2007. The entire contents of these applications are incorporated herein by reference.

BACKGROUND OF THE INVENTION

1. Field of the Invention

The present invention relates to techniques for generating a trace stream for a data processing apparatus containing trace elements indicative of the activities of certain logic of the data processing apparatus.

2. Description of the Prior Art

Tracing the activity of a data processing system whereby a stream of trace elements is generated including data representing the step-by-step activity within the system is a highly useful tool in system development. However, with the general move towards more deeply embedded processor cores, it becomes more difficult to track the activities of the processor core or other on-chip devices via externally accessible pins. Accordingly, as well as off-chip tracing mechanisms for capturing and analyzing trace data, increased amounts of tracing functionality are being placed on-chip. An example of such on-chip tracing mechanisms is the Embedded Trace Macrocell (ETM) provided by ARM Limited, Cambridge, England, in association with a variety of their ARM processors.

Such tracing mechanisms produce in real-time a stream of trace elements representing activities of the data processing apparatus that are desired to be traced. This trace stream can then subsequently be analyzed for a variety of purposes, for example to facilitate debugging of sequences of processing instructions being executed by the data processing apparatus, for performing profiling operations in order to determine the performance of particular program code being executed on the data processing apparatus, etc.

Typically, the stream of trace elements that is generated by the trace mechanism is buffered prior to output for subsequent analysis. Such a trace buffer is able to store a finite amount of information and requires a dedicated data bus which has a finite bandwidth over which the elements to be buffered can be received. The trace buffer is generally arranged to store information in a wrap-around manner, i.e. once the trace buffer is full, new data is typically arranged to overwrite the oldest data stored therein. It has been found that the bandwidth of the dedicated data bus limits the rate at which information can be stored in the trace buffer.

Typically, a trace analyzing tool is provided which receives the stream of trace elements from the trace buffer when desired, for example once the trace has completed. The trace analyzing tool can then be used to reconstruct the activities of the device being traced based on the received trace elements. As devices such as processor cores increase in power and complexity, it is clear that the amount of information required to track the activities of such devices will increase, and accordingly there will potentially be a very large volume of trace elements that need to be traced.

However, there is a problem that there is finite bus bandwidth over which the trace elements can be output by the trace logic, and any trace buffer used to buffer such trace elements will have a finite size. Accordingly, the volume of trace elements that can be generated is limited.

The activities of a device that might want to be traced include, but are not limited to, the instructions being executed by a processor core (referred to as instruction trace), and the memory accesses made by those instructions (referred to as data trace). These activities may be individually traced or traced together, so that the data trace can be correlated with the instruction trace. The data trace itself consists of two parts, the memory addresses and the data values, referred to (respectively) as data address and data value trace. Again, the existing trace ETM protocols allow for data address and data value tracing to be enabled independently or simultaneously.

Experience shows that for existing processor cores and ETM protocols, a bit rate of less than 2 bits per instruction is achieved for instruction tracing only. However, to illustrate the above problem, a bit rate of approximately 10 to 16 bits per instruction is achieved for instruction and data address tracing. Therefore a processor having an operating speed of approximately 1 GHz executing one instruction per cycle will generate approximately 10 to 16 Gbits/s of trace data, all of which must be taken off-chip and captured in a fixed-size buffer. In addition to tracing instructions and data addresses, certain classes of problem also require data value tracing to be performed, and this will further increase the amount of trace data that needs to be generated to over 20 bits per instruction. Collectively, the two elements of data tracing, namely the data address tracing and the data value tracing, contribute to a large proportion of the overall volume of trace elements produced.

Current ETM logic can also be arranged to provide a cycle accurate mode of operation, in which further information is included within the trace stream to indicate each clock cycle, such that when subsequently analyzing the trace elements within the trace stream, an indication of the clock cycle in which the associated activity took place within the traced device can be determined. Whilst such a cycle accurate mode of operation can be useful in many situations, it significantly increases the volume of trace data produced, irrespective of whether instruction trace, data trace, or a combination of both, is being performed. In situations where the volume of trace data being produced is already very large, the extra increase in volume resulting from performing cycle accurate trace can cause significant problems, having regard to the finite bus bandwidth over which the trace elements can be output by the trace logic, and the finite size of the trace buffer used to buffer such trace elements.

Accordingly, it would be desirable to provide an improved technique for generating a stream of trace elements, so as to enable more effective use to be made of the finite bus bandwidth over which the trace elements can be output, and the finite size of any trace buffer in which those trace elements are buffered.

SUMMARY OF THE INVENTION

Viewed from a first aspect, the present invention provides a data processing apparatus, comprising: logic operable to produce data elements; and trace logic operable to produce a stream of trace elements representative of at least some of said data elements, the trace logic having trace generation logic operable to generate trace elements for inclusion in said stream, said trace generation logic further operable to generate trace timing indicators for inclusion in said stream, each trace timing indicator indicating the elapse of one or more processing timing intervals, said processing timing interval being a predetermined plurality of clock cycles.

In accordance with the present invention, the trace generation logic is arranged to generate trace timing indicators for inclusion in the stream, with each trace timing indicator indicating the elapse of one or more processing timing intervals, and with the processing timing interval being a predetermined plurality of clock cycles. Conventionally, cycle accurate trace has involved identifying every clock cycle and then including information at that single-cycle level within the trace stream produced. However, the inventors of the present invention have realised that as the logic whose activities are being traced becomes more complex, situations arise where the information included in the trace stream indicative of each elapsed clock cycle is not as accurate as expected, and can become misleading. As an example, considering a situation where the logic whose activities are being traced is a processor core, modern processor cores are becoming ever more complex, and may for example support execution of instructions and data transfers out of order. For such processor cores, buffering is sometimes required within the trace logic to retain instruction and data transfer information until such time as the information can be output in an efficient manner. In particular, it is often advantageous to re-order all of the information, since for example compression of in-order instructions is much more effective and easier than in out-of-order situations. In such situations, the buffering would not hold all the cycle information relating to the precise execution of the instructions, and hence single cycle accuracy does not precisely indicate the execution of instructions.

Based on this realisation, the inventors of the present invention determined that a significant reduction in the volume of trace data could be achieved by setting as a processing timing interval a predetermined plurality of clock cycles, and then including trace timing indicators in the trace stream indicating the elapse of one or more of those processing timing intervals. As a result, this reduces the amount of information that needs to be traced, but has been found to provide a level of cycle accuracy that is sufficient having regard to the complex nature of the logic whose activities are to be traced.

It is often the case that the individual trace elements to be included in the trace stream are subject to one or more compression techniques before the stream is produced. By employing a technique whereby trace timing indicators are generated indicating the elapse of one or more processing timing intervals, where those processing timing intervals are a predetermined plurality of clock cycles, it has been found that this not only reduces the volume of information to be traced, but can also in certain situations lead to improved compression, and hence a further reduction in the bandwidth consumed when producing the stream of trace elements.

The data elements received by the trace logic can take a variety of forms provided they give sufficient information for the required stream of trace elements to be generated therefrom. Further, the data elements may be transmitted from the logic (also referred to herein as the traced device) to the trace logic, or alternatively may be retrieved by the trace logic from that traced device. As an example, the data elements may comprise instruction address values, data address values, or data values. The trace elements produced by the trace generation logic are then typically arranged to contain sufficient information to enable those data elements to be later determined by trace analysing logic analysing the trace stream.

In one embodiment, the trace generation logic may be provided with control information identifying one or more events of interest. The events of interest could take a variety of forms. For example, such events may relate to particular instructions in the code executed by the logic being traced, for example branch instructions. In such situations, when the data elements received from the logic indicate the execution of a branch instruction, this can be identified as an event of interest. Typically, in such situations, a trace element may be included in the stream indicative of that event of interest. However, it should be noted that not all events of interest will necessarily give rise to the presence of trace elements in the trace stream. For example, an event of interest could be a particular event occurring internally within the trace logic, or indeed an external event notified to the trace logic, which may not in itself require the generation of a trace element. As some examples, an event of interest may be the elapsing of a particular number of clock cycles without any other event of interest having occurred, a change in processor clock speed, or an indication that another processor has changed state or has executed a particular instruction.

The trace generation logic can be arranged to be aware of the events of interest in a variety of ways. For example, in one embodiment, such events can in effect be hard-wired into the trace generation logic, such that the events of interest are predetermined. However, alternatively, such events of interest may be programmed from an external source, and hence for example may be programmed into one or more control registers of the trace logic from an appropriate source, for example from the trace analysing tool that will subsequently analyse the stream of trace elements produced by the trace logic.

Whilst it is possible that the predetermined plurality of clock cycles constituting a processing timing interval may be fixed, significant further benefits arise if the processing timing interval is arranged to be configurable. In such embodiments, the data processing apparatus further comprises storage for retaining a current processing timing interval, and the trace generation logic is operable to reference that storage in order to determine when to generate each trace timing indicator. In one embodiment, the storage may be provided within the trace logic itself, and the current processing timing interval stored therein may be set in a variety of ways. For example, in one embodiment, the storage may be provided as one of a number of control registers within the trace logic, which may be set from an external source in order to configure the current processing timing interval. For example, a trace analysing tool is typically arranged to analyse the stream of trace elements produced by the trace logic. In such embodiments, the trace analysing tool may be arranged to configure the current processing timing interval to be used, and this interval may be re-programmed by the trace analysing tool as and when deemed appropriate by the user of the trace analysing tool.

In an alternative embodiment, the trace generation logic is operable to alter the processing timing interval in response to an occurrence of one or more predetermined events.

The predetermined events that may cause the trace generation logic to alter the processing timing interval can take a variety of forms. However, in one embodiment, the data elements produced by the logic are indicative of program code being executed by that logic, the trace generation logic has one or more control registers programmed to identify different processing timing intervals to be used for trace elements generated in respect of different code portions, and the trace generation logic is operable to alter said processing timing interval dependent on which code portion trace elements are being generated in respect of. Such an approach hence enables the processing timing interval to be altered dynamically as the trace stream is produced dependent on the activities being traced. As an example, it may be decided that a high level of timing accuracy is required for application code, but only an approximate passage of time is required in connection with library code. The information in the control registers can then be programmed to cause different address comparators to match dependent on whether application code is being traced or library code is being traced. Whenever application code is being traced, a shorter processing timing interval may be used, and whenever library code is being traced, a longer processing timing interval may be used.

The processing timing interval might also be changed by some external event, such as an interrupt. For example, when analysing normal application code, a low level of timing accuracy may be all that is required, but when analysing interrupt processing routines, a high degree of timing accuracy is more typically required. Accordingly, the occurrence of the interrupt could cause the processing timing interval to be changed to provide a higher degree of accuracy, and when the interrupt handler is completed the processing timing interval could then be changed back to provide a lower degree of accuracy.

As another example of how the trace generation logic may alter the processing timing interval in response to an occurrence of one or more predetermined events, if the trace generation logic is provided with control information identifying one or more events of interest, it may alter said processing timing interval based on analysis of the frequency with which said events of interest are occurring. Hence, in such embodiments, the predetermined event is the analysis performed by the trace generation logic, which can cause an adjustment in the current processing timing interval. For example, if based on a previously generated portion of the trace stream, the trace generation logic determines that events of interest are only occurring once every twenty clock cycles, but the current processing timing interval is set to four cycles, then it may be determined appropriate to increase the current processing timing interval, for example to sixteen clock cycles.

In one embodiment, when the processing timing interval is changed, the trace generation logic is operable to include within the stream a timing change indicator indicating the change. Hence, in such a manner, the trace analysing tool that subsequently analyses the trace stream will be able to identify a change in the processing timing interval. In some embodiments, in particular where the trace analysing tool is the only entity which changes the processing timing interval, there may be no need for such a timing change indicator to be inserted within the trace stream.

There are a number of ways in which the trace generation logic can be arranged to output the trace timing indicator. In one embodiment, the trace generation logic is operable to output said trace timing indicator in said trace stream after each processing timing interval. Hence, in such embodiments, irrespective of the activities traced in any particular processing timing interval, the trace timing indicator is always produced after each such processing timing interval, and hence is repeated at regular intervals during the duration of the trace stream generation.

The trace timing indicator can take a variety of forms. For example, it may in one embodiment be arranged to identify the one or more processing timing intervals that have elapsed since the last trace timing indicator was produced. In the earlier-mentioned embodiment where the trace timing indicator is output after each processing timing interval, it will hence be appreciated in such embodiments that the trace timing indicator can merely take a single bit value identifying that one processing timing interval has expired since the last trace timing indicator was output. With such a form of trace timing indicator, it will be appreciated that the trace analyser that is subsequently to analyse the trace stream needs to know the processing timing interval that was applicable at the time the trace timing indicator was produced.

In an alternative embodiment, the trace timing indicator indicates the number of the predetermined plurality of clock cycles. Hence, in such embodiments, if the processing timing interval is currently set to four clock cycles, and the trace timing indicator is produced after each processing timing interval, each trace timing indicator will identify the number four. This may provide a less efficient encoding, but avoids the need for the trace analysing tool to know the processing timing interval being used at any point in time.

In one embodiment, the trace generation logic is provided with control information identifying one or more events of interest, and is operable to suppress the output of a trace timing indicator when no event of interest occurs during that processing timing interval. Hence, in such embodiments, further efficiency can be realised by suppressing particular occurrences of a trace timing indicator during "quiet periods" in the trace stream.

In one such embodiment, the trace generation logic is operable to output a trace timing indicator indicating the number of processing timing intervals that have elapsed since the output of the previous trace timing indicator when an event of interest occurs. Hence, in such embodiments, particular trace timing indicators may be suppressed when no event of interest occurs during a particular processing timing interval, but when subsequently an event of interest does occur, the trace timing indicator is output indicating the number of processing timing intervals that have elapsed since the output of the previous trace timing indicator. Hence, by way of example, if the current processing timing interval is set to four cycles, and ten cycles elapse between a previous trace timing indicator being produced and the first event of interest occurring subsequent to that last trace timing indicator, then a trace timing indicator may be produced at the time the event of interest occurs identifying that two processing timing intervals (i.e. eight cycles) have elapsed since the output of the previous trace timing indicator. Whilst this does not provide exact timing for the event of interest, it provides timing which is accurate to the four cycle level specified and also produces timing indicators in a very efficient manner by avoiding the generation of any unnecessary trace timing indicators.

In an alternative embodiment the trace generation logic is operable to suppress the output of a trace timing indicator until a number of events of interest have occurred, and then to output a trace timing indicator indicating the number of processing timing intervals that have elapsed since the output of the previous trace timing indicator. This can further reduce the frequency with which the timing indicator needs to be produced in the trace stream.

The number of events of interest between trace timing indicators may in one embodiment be predetermined. However, in an alternative embodiment, the number of events of interest is determined dynamically by the compression logic within the trace logic. By way of example, the trace protocol might pack multiple indicators of events of interest into a single trace packet and only output one trace timing indicator. Based on the packing algorithm in use, this might mean a variable number of events of interest are output in a single trace packet.

In one embodiment, the trace generation logic is provided with control information identifying one or more events of interest, and is further operable, on occurrence of one of said events of interest, to output an additional trace timing indicator indicating the number of clock cycles that have elapsed since the previous trace timing indicator. Hence, in such embodiments, irrespective of whether a trace timing indicator is produced at the time an event of interest occurs, an additional trace timing indicator can be output indicating a current clock count indicating the number of cycles that have elapsed since the previous trace timing indicator. Considering the earlier example, where an event of interest occurred ten cycles after the last trace timing indicator, such an embodiment may be arranged on the occurrence of the event of interest to output a trace timing indicator identifying that two processing timing intervals (i.e. eight cycles) have elapsed, and an additional trace timing indicator specifying two cycles, thereby providing single cycle accuracy in respect of the particular event of interest.

In one embodiment, the trace generation logic is operable to alter the processing timing interval to prevent the trace stream exceeding a bandwidth available to the trace generation unit. Accordingly, in such embodiments, the trace logic can dynamically change the processing timing interval having regard to available bandwidth. Whilst this may require a significant reduction in the cycle accuracy provided for a period of time, this would generally be more beneficial than in a typical prior art system, where in such situations certain trace data would be lost once the available bandwidth is exceeded.

In one embodiment, certain trace elements can be arranged to imply a certain number of clock cycles. For example, a trace element identifying the execution of an instruction may imply one clock cycle. In one such embodiment, the trace generation logic is operable, when the elapse of a number of clock cycles within a processing timing interval is derivable from said trace elements output in said stream during said processing timing interval, to extend said processing timing interval by said number of clock cycles, such that when the trace timing indicator is subsequently included in the stream, a total number of clock cycles that have elapsed since the output of the previous trace timing indicator is derivable from the number of processing timing intervals indicated by the trace timing indicator in combination with said number of clock cycles derivable from said trace elements. This can further improve the efficiency of the system by reducing the amount of timing information required to be produced within the trace stream.

In one embodiment, the number of clock cycles inferred by a particular trace element may be predetermined. However, in an alternative embodiment, the trace generation logic has one or more control registers programmed to identify, for each of one or more types of trace element, a number of clock cycles to be inferred by that type of trace element, the trace generation logic being operable to reference said one or more control registers when determining said number of clock cycles by which to extend said processing timing interval. Such control registers may for example be programmed by the trace analysing tool to identify the number of clock cycles that it will infer upon receipt of particular trace elements.

Viewed from a second aspect, the present invention provides trace logic for generating a stream of trace elements representative of at least some data elements produced by logic of a data processing apparatus, said trace logic comprising: trace element generation logic operable to generate trace elements for inclusion in said stream; and timing indication logic operable to generate trace timing indicators for inclusion in said stream, each trace timing indicator indicating the elapse of one or more processing timing intervals, said processing timing interval being a predetermined plurality of clock cycles.

Viewed from a third aspect, the present invention provides a trace analysing apparatus for analysing a stream of trace elements generated by a data processing apparatus in accordance with the first aspect of the present invention, comprising: storage for storing a current processing timing interval; and trace expansion logic operable on receipt of a trace timing indicator in said stream to reference said current processing timing interval in order to determine a clock cycle count value to be inserted in said stream.

Viewed from a fourth aspect, the present invention provides a method of operating a data processing system, comprising the steps of: producing data elements; employing trace logic to receive indications of said data elements, and to produce a stream of trace elements representative of at least some of said data elements; and generating trace timing indicators for inclusion in said stream, each trace timing indicator indicating the elapse of one or more processing timing intervals, said processing timing interval being a predetermined plurality of clock cycles.

Viewed from a fifth aspect, the present invention provides a computer program product comprising a computer program operable to cause a computer to analyse a stream of trace elements generated by the method of the fourth aspect of the present invention by performing the steps of: storing a current processing timing interval; and on receipt of a trace timing indicator in said stream, referencing said current processing timing interval in order to determine a clock cycle count value to be inserted in said stream.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
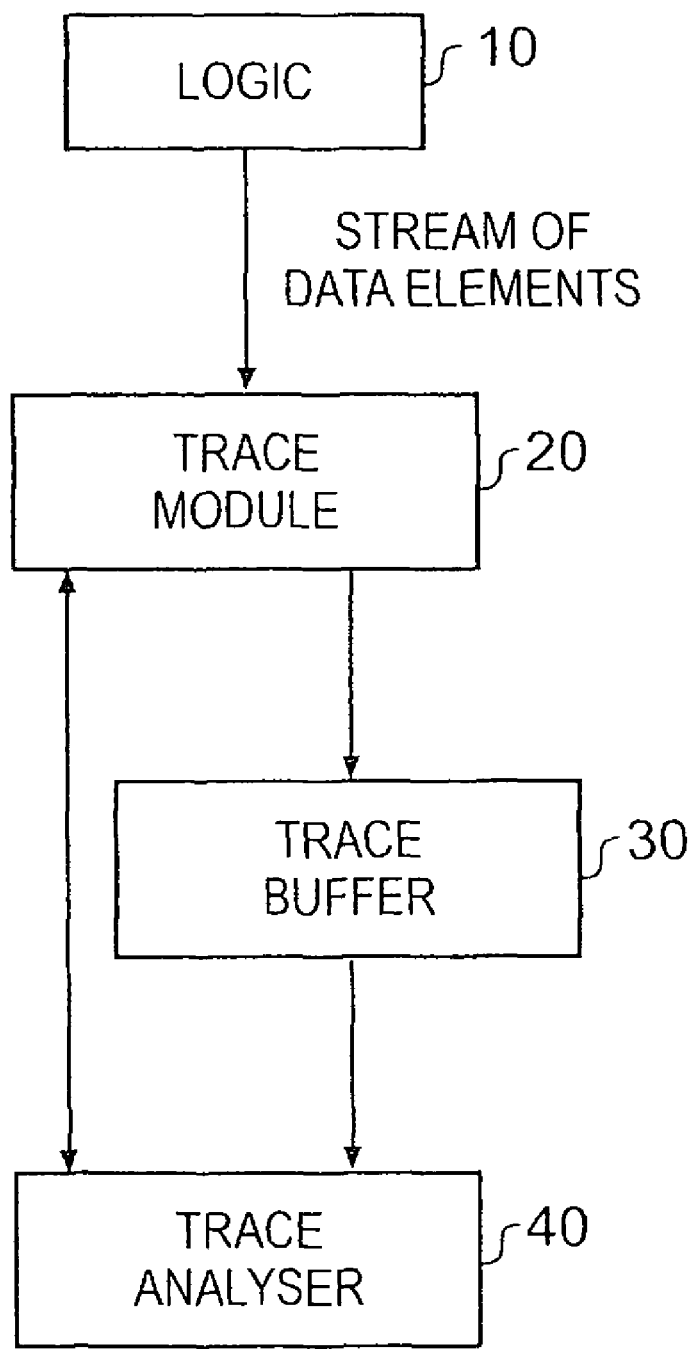
FIG. 1 is a block diagram of a data processing system is accordance with one embodiment of the present invention.

FIG. 1 schematically illustrates a data processing system providing logic 10, a trace module 20, a trace buffer 30 and a trace analyser 40. Whilst FIG. 1 illustrates a data processing system providing a trace buffer 30, in alternative embodiments the trace module 20 may pass its output straight to the trace analyser 40, without going via a trace buffer.

The logic 10 producing the stream of data elements received by the trace module 20 can take a variety of forms, and may for example be a processor core, a Direct Memory Access (DMA) engine, a data engine/accelerator, etc. Alternatively, the logic 10 may consist of a plurality of devices coupled by a bus, and the data elements may be monitored by the trace module 20 as they pass over the bus.

The trace analyser 40, which may in one embodiment be formed by a general purpose computer running appropriate software, is coupled to the trace module 20 and the trace buffer 30. The trace module 20, typically embodied on-chip, is arranged to receive data elements from logic 10 and dependent thereon produces a stream of trace elements which are stored in the trace buffer 30 (which may be provided on or off chip). The trace analyser 40, typically embodied off-chip, is then used to analyse that stream of trace elements in order to derive information indicative of the activities of the logic being traced 10. In particular, through analysis of the stream of trace elements, the detailed activity of the logic 10 can be determined.

The trace analyser 40 is connected to the trace module 20 to enable certain features of the trace module to be controlled by the user of the trace analyser. Additionally, in some embodiments, the stream of trace elements produced by the trace module 20 may be provided directly to the trace analyser 40 rather than being buffered in the trace buffer 30.

Figure 2:
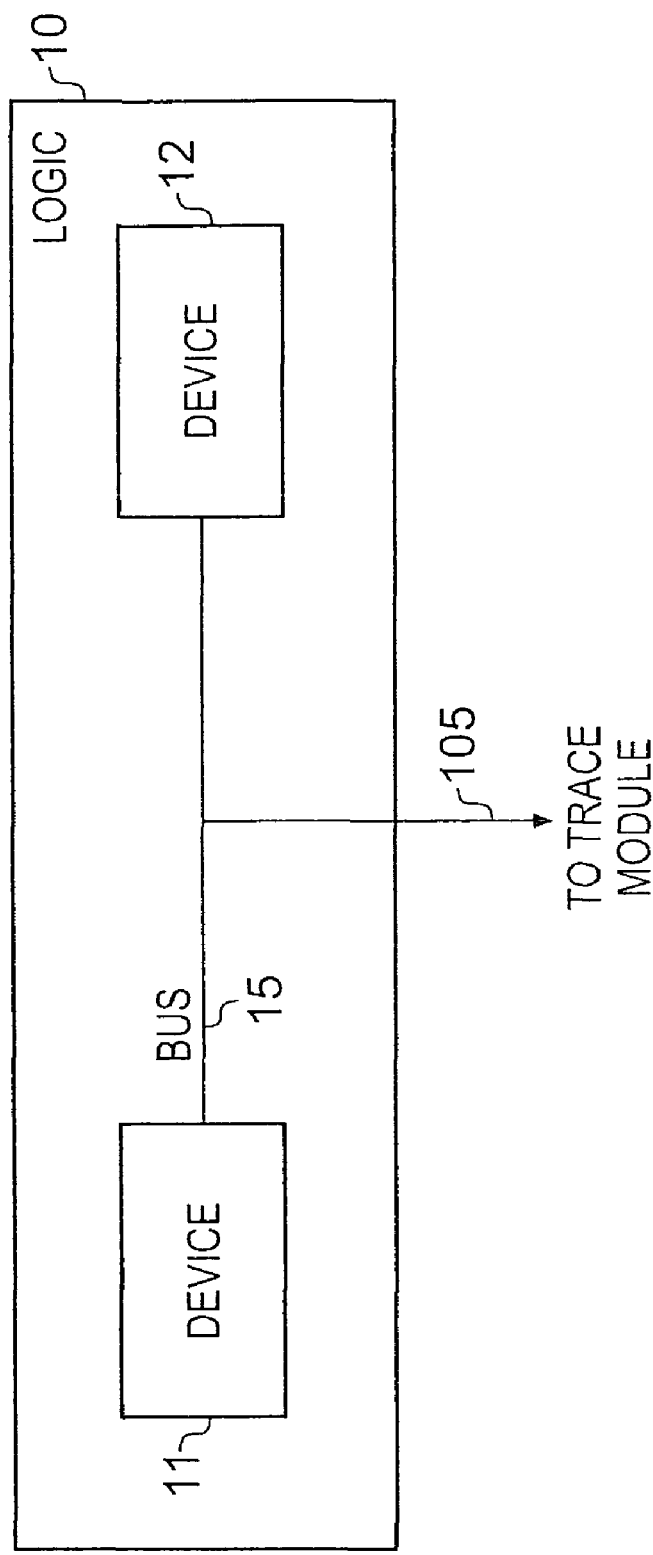
FIG. 2 is a block diagram illustrating an example of the logic block of FIG. 1 in accordance with one embodiment.

FIG. 2 is a block diagram of an example of the logic 10 of FIG. 1. In this example the logic 10 comprises two devices (11, 12) connected by a bus 15. The bus is linked to the trace module 20, via connection 105, over which data elements produced by the logic are passed.

Figure 3:
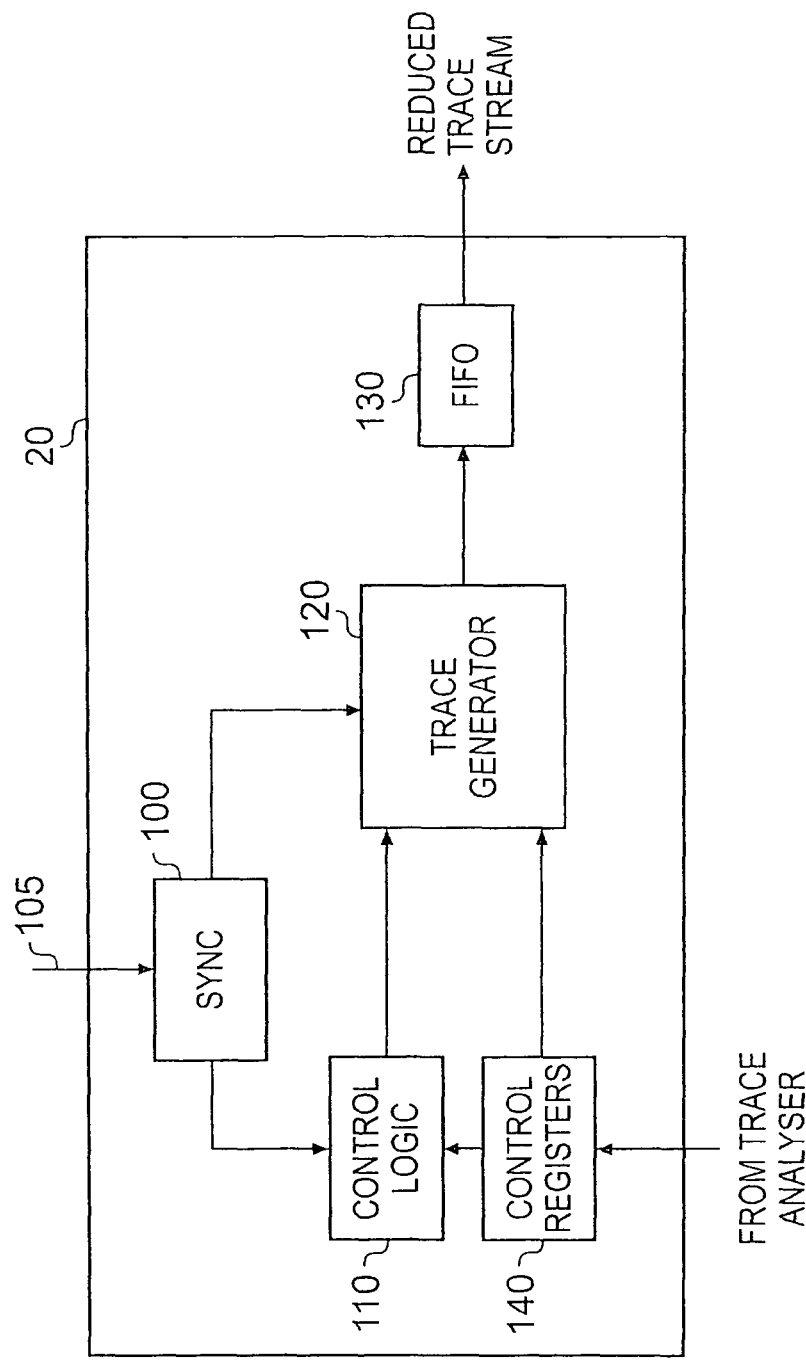
FIG. 3 is a block diagram illustrating in more detail the on-chip trace module of FIG. 1 in accordance with one embodiment.

FIG. 3 is a block diagram of the trace module 20 in accordance with one embodiment. The trace module 20 is arranged to receive over path 105 data elements indicative of the state or operation of the logic being traced. The sync logic 100 is arranged to convert the incoming signals into internal versions of the signals more appropriate for use within the trace module 20. These internal versions are then sent to the control logic 110 and the trace generation logic 120, although it will be appreciated that the control logic 110 and the trace generation 120 will not necessarily need to receive the same signals. Fundamentally, the control logic 110 needs to receive data relating to triggerable events, for example instruction addresses, data values, register accesses, etc so that it can determine whether trace should be activated, and what types of data elements should be traced. It then issues appropriate control signals to the trace generation logic 120 to cause the required trace elements to be generated by the trace generation logic 120. The trace generation logic 120 receives via the sync logic 100 any data that would need to be traced dependent on the control signals issued by the control logic 110.

In accordance with embodiments of the present invention, control registers 140 are provided which are used to configure the operation of the control logic 110, these control registers 140 being settable from the trace analyser 40. A number of control registers can be provided, which fundamentally direct two elements of the trace generation logic operation— "when" to generate trace elements, e.g. when a particular range of addresses is accessed, and "what" to generate those trace elements for, e.g. the data address and/or data value of a particular transfer and, typically, supplementary information about the transfer such as whether it is a read or a write operation, whether it is locked, security information etc.

Triggered by a control signal issued by the control logic 110 that a "when" condition is met, the trace generation logic 120 generates the required trace elements indicative of the data elements it is receiving from the sync logic 100, in accordance with the associated "what" signal it also receives from the control logic. These generated trace elements are output to the FIFO 130. From here, the trace stream is then output to the trace buffer 30, or in alternative embodiments is output directly to the trace analyser 40.

In accordance with embodiments of the present invention, the trace generator 120 is arranged, in addition to the usual trace elements, to produce trace timing indicators which are then included in the trace stream, each trace timing indicator indicating the elapse of one or more processing timing intervals, where the processing timing interval is set to be a predetermined plurality of clock cycles. Whilst the processing timing interval may be fixed for any particular implementation, in one embodiment of the present invention it is configurable, with the trace generator 120 maintaining the current processing timing interval for reference when generating each trace timing indicator. There are a number of ways in which the processing timing interval may be configurable. In one embodiment, it may be statically configurable, such as for example by allowing the trace analyser 40 to set a current processing timing interval within one of the control registers 140, with that value then being read by the trace generator 120. In alternative embodiments, the processing timing interval is dynamically configurable by the trace generator 120 during the generation of a trace stream, in order to take into account occurrence of one or more predetermined events. For example, the trace analyser 40 may be arranged to identify within certain control registers 140 different processing timing intervals to be used for trace elements generated in respect of different code portions executed by the logic 10. The trace generator 120 is then arranged when generating trace elements for particular code portions to reference the information in the control registers in order to determine the appropriate processing timing interval for the code portion currently being traced, and to then generate trace timing indicators having regard to that processing timing interval.

It is often the case that when a particular tracing activity is taking place, there are a number of events of interest that the user of the trace analyser is particular interested in observing the presence of. The trace generator 120 is provided with control information identifying such events of interest, such information either being fixed, or alternatively being programmable, for example by enabling the trace analyser to identify such events of interest by appropriate setting of one or more of the control registers 140. As another example of dynamic configuration of the processing timing interval, in such embodiments where events of interest are identified, the trace generator 120 may be arranged periodically to perform some self-analysis to identify the frequency with which events of interest are occurring within the trace stream. If such events of interest are occurring at a frequency much lower than the frequency with which the processing timing interval is elapsing, then in such embodiments the trace generator 120 may be arranged to increase the processing timing interval accordingly.

In one embodiment, whenever the trace generator 120 dynamically changes the processing timing interval, it is arranged to include within the stream a timing change indicator indicating the change, so that when the trace stream is subsequently analysed by the trace analyser 40, the change in the processing timing interval can be taken into account when interpreting each trace timing indicator.

It will be appreciated that the trace timing indicators produced by the trace generation logic, and indeed any timing change indicator, can be considered to be additional trace elements for inclusion in the trace stream. In particular, when cycle accuracy is required, the trace generator 120 is arranged to produce these additional indicators in addition to the usual trace elements. However, due to the fact that in embodiments of the present invention, the processing timing interval is set to be a plurality of clock cycles, then significantly less information is generated by the trace generator for output in the stream than would be the case using a prior art system employing single cycle accuracy, thus giving rise to the production of a reduced trace stream which can be output from the trace logic 20. Further, due to the configurable nature of the processing timing interval, this allows a trade-off between accuracy and bandwidth in all tracing situations, whether performing instruction trace, data trace, or a combination of both.

It has been found that as the devices being traced become more complex, there are situations where performing cycle accuracy on a single cycle level (such as is done in prior art systems) does not in any event precisely indicate the execution of instructions. For example, as mentioned previously, processing devices can often now implement out-of-order instruction execution, and the buffering of the instruction stream takes place prior to tracing in order to allow the information to be re-ordered so as to facilitate better compression. In such situations the buffering often means that the cycle accurate nature of the trace is not as accurate as a user expects. By use of the configurable processing timing interval implemented in embodiments of the present invention, the cycle accuracy of the trace can be configured as deemed appropriate, for example by a user of a trace analyser, thus saving trace bandwidth whilst maintaining a reasonable level of cycle information.

Furthermore, future systems are likely to be based on multiple processors, where the interactions between those processors need to be traced. By use of the techniques of embodiments of the present invention, the amount of trace data required per device can be significantly reduced, which is important as more devices need to be traced.

In many embodiments, the trace generator 120 is arranged prior to outputting the required trace elements, to perform compression techniques in order to produce a compressed trace stream for output to the FIFO 130. As mentioned earlier, in accordance with embodiments of the present invention, the amount of information that needs to be traced when performing cycle accuracy can be significantly reduced. Furthermore, it has been found that more efficient compression can also be achieved in many situations, thereby providing further savings in trace bandwidth.

Figure 4:
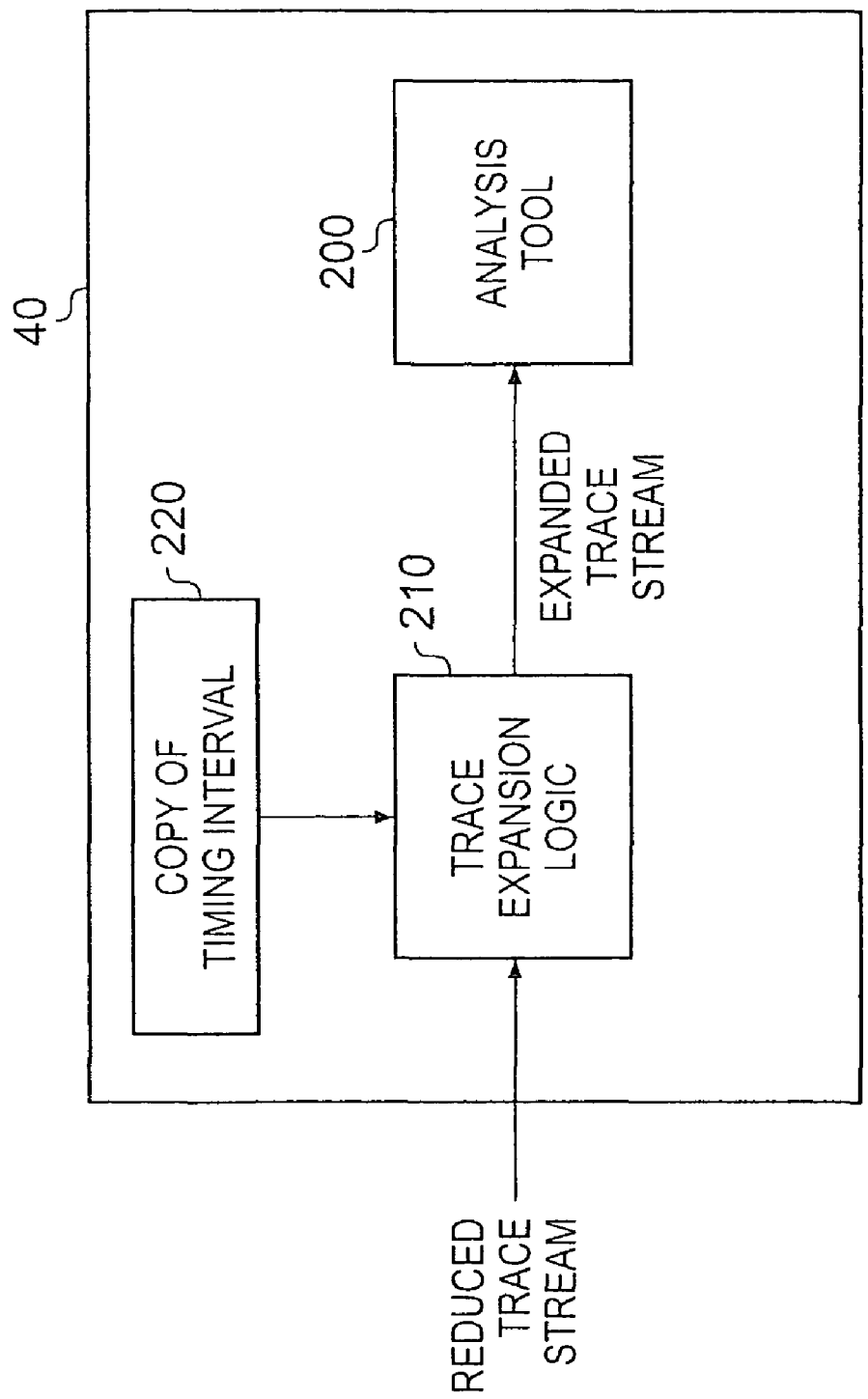
FIG. 4 is a block diagram illustrating in more detail the trace analyser of FIG. 1 in accordance with one embodiment.

FIG. 4 is a block diagram illustrating the operation of the trace analyser 40 in accordance with embodiments of the present invention. The analysis tool 200 represents the standard analysis tool used to analyse the trace stream that would be generated prior to the system using the techniques of embodiments of the present invention. The trace expansion logic 210 identifies the additional logic incorporated with the analysis tool to expand the reduced trace stream that results from the use of the trace timing indicators described earlier. The reduced trace stream output from the trace logic 20 is received by the trace expansion logic 210 which maintains a copy of the current processing timing interval in the register 220. Accordingly, whenever a trace timing indicator is observed within the reduced trace stream, the trace expansion logic 210 can replace that trace timing indicator with a clock cycle count value determined with reference to the timing interval information retained in the register 220. This gives rise to an expanded trace stream which can then be analysed by the analysis tool 200.

It will be appreciated that there may be no requirement for the trace expansion logic 210 to perform the above described function prior to the analysis tool 200 performing any required analysis on the trace stream, since much of the analysis performed may not require the expanded timing information. Further, in one embodiment, both the trace expansion logic 210 and the analysis tool 200 may be formed as a single cohesive piece of logic. In one embodiment, both the trace expansion logic 210 and the analysis tool 200 may be formed by appropriate software executing on the trace analyser 40.

As mentioned earlier, in some embodiments, the trace generator 120 can dynamically configure the processing timing interval, and whenever the processing timing interval is changed in such a manner, the trace generator 120 is in one embodiment arranged to output a timing change indicator in the trace stream. Whenever such a timing change indicator is observed by the trace expansion logic 220, it updates its copy of the timing interval within the register 220 accordingly, so that any subsequent trace timing indicators received in the trace stream are correctly interpreted by the trace expansion logic 210.

Figure 5:
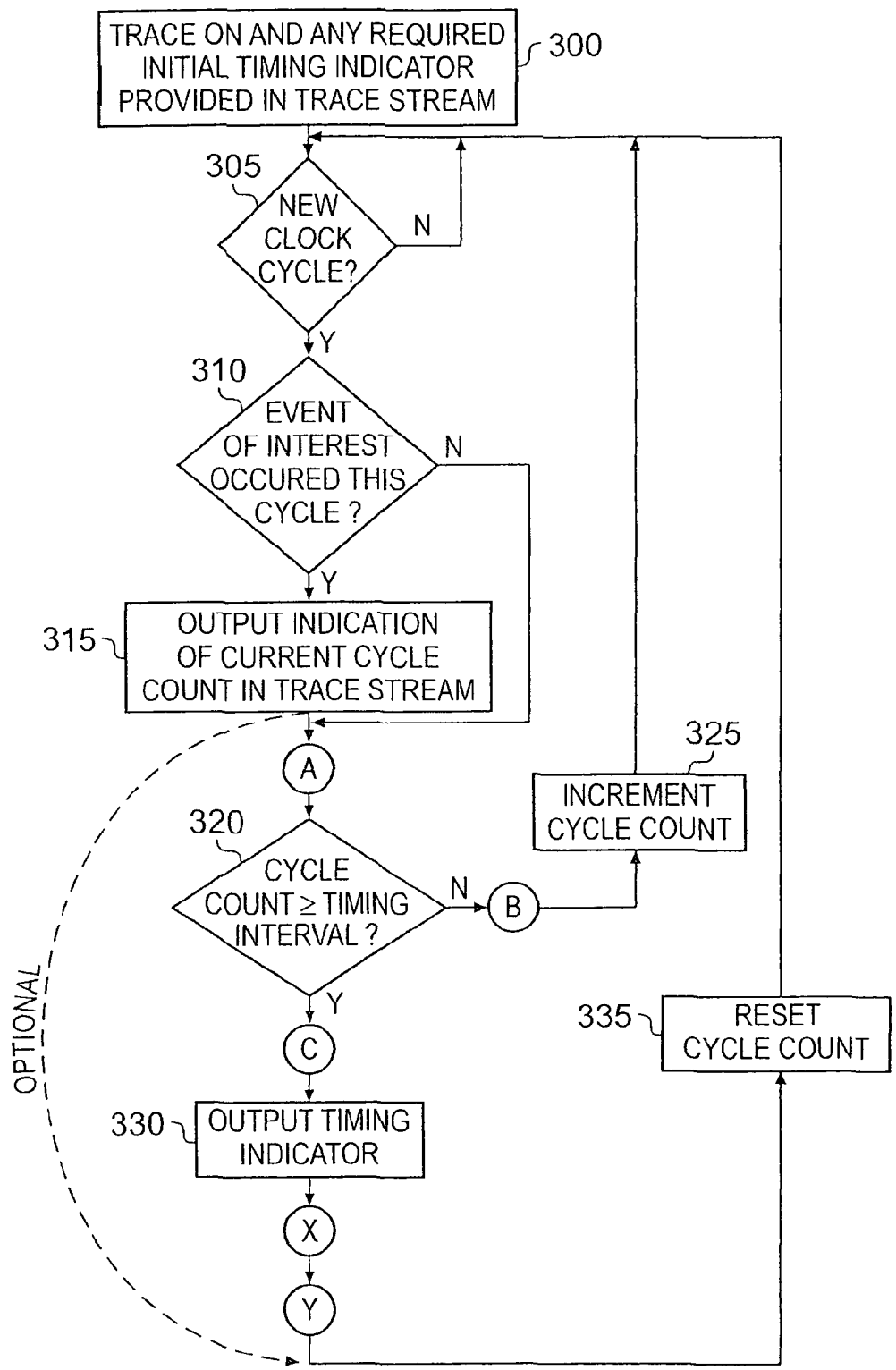
FIG. 5 is a flow diagram illustrating a sequence of steps performed within the on-chip trace module of FIG. 1 in accordance with one embodiment in order to produce timing indicators for inclusion in the trace stream.

There are a number of ways in which the trace timing indicators may be included in the trace stream. FIG. 5 is a flow diagram illustrating one sequence of steps that may be performed by the trace generator 120, in which the trace timing indicator is output after every processing timing interval, such that the timing indicator in effect takes the form of a heartbeat within the trace stream. As shown in FIG. 5, at step 300 it is assumed that tracing is currently on, and any required initial timing indicator has been provided in the trace stream. As will be appreciated by those skilled in the art, when trace initially starts, some initial information may have to be included at the start of the trace stream to enable the trace analyser to correctly determine the starting point of the trace, this information for example including the full address of an instruction that is currently executing, and some initial timing information.

Thereafter, the process proceeds to step 305, where it is determined whether a new clock cycle has occurred. Once a new clock cycle has occurred, then at step 310 it is determined whether an event of interest has occurred in this cycle. If not, then the process proceeds directly to step 320, whereas if an event of interest has occurred this cycle, then at step 315 an indication of the current cycle count is output in the trace stream.

In FIG. 5, only the steps required to output timing information are shown, and it will be appreciated that when an event of interest has occurred it will often be the case, though it is not essential, that a corresponding trace element may also be produced for inclusion in the trace stream. Indeed, trace elements will often be produced for inclusion in the trace stream even if they do not relate to events of interest. As an example, when instruction trace is turned on, there will typically be trace elements produced for every instruction executed. However, not all instructions may correspond to events of interest, and only certain instructions, for example branch instructions, may be considered to be events of interest. Other events of interest may not relate to the instructions executed themselves, but may relate to other events occurring internally within the trace logic, or externally to the trace logic.

By outputting an indication of the current cycle count at step 315, this provides a high level of accuracy within the trace stream concerning the timing of the event of interest.

When the process proceeds to step 320, it is determined whether the current cycle count is greater than or equal to the timing interval. If not, then the process proceeds to step 325 where the cycle count is incremented, whereafter the process returns to step 305. However, if the cycle count is greater than or equal to the timing interval, then the process proceeds to step 330, where the timing indicator is output in the trace stream. This timing indicator may for example be a single bit value identifying the elapse of the current processing timing interval, or alternatively may be a value directly indicating the number of clock cycles forming the processing timing interval. After issuing the timing indicator, the process proceeds to step 335 where the cycle count is reset, whereafter the process returns to step 305.

As indicated by the dotted line in FIG. 5, in an alternative embodiment, assuming an event of interest has occurred at step 310, and accordingly a current cycle count has been indicated in the trace stream at step 315, the process may proceed directly from step 315 to step 335, rather than proceeding to step 320 and any steps required thereafter. Hence, in accordance with this alternative embodiment, the timing indicator is not merely output every timing interval irrespective of events occurring in the meantime, but instead on the occurrence of an event of interest, the current cycle count is output and the cycle count is then reset. Accordingly, another timing indicator will not then be produced until the processing timing interval has elapsed following the time at which the current cycle count was output at step 315 (assuming of course no further events of interest occur in the interim).

Whilst FIG. 5 illustrates one embodiment, it will be appreciated that various modifications could be made. For example, in some embodiments, it may be deemed that steps 310 and 315 are unnecessary, and it is merely sufficient for the timing indicator to be output each time the processing timing interval elapses.

Figure 6:
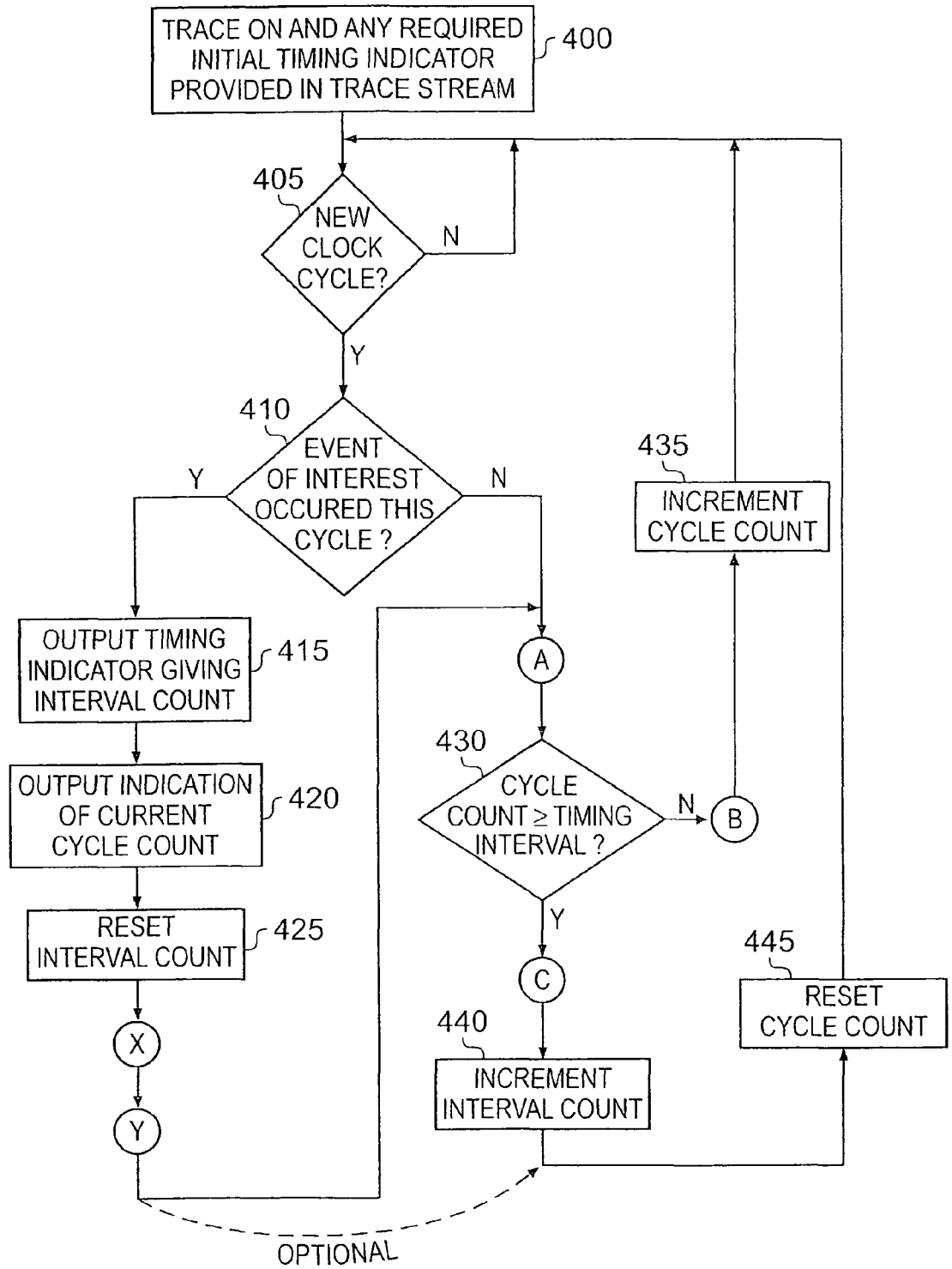
FIG. 6 is a flow diagram illustrating a sequence of steps performed within the on-chip trace module of FIG. 1 in accordance with an alternative embodiment in order to produce timing indicators for inclusion in the trace stream.

FIG. 6 illustrates an alternative embodiment where the timing indicator is not necessarily output each time the processing timing interval elapses, but instead output of the trace timing indicator can be suppressed when no event of interest occurs during a particular processing timing interval. As will be appreciated from a comparison of FIG. 6 with FIG. 5, steps 400, 405 and 410 are analogous to steps 300, 305 and 310 of FIG. 5. If an event of interest is determined to have occurred at step 410, then the process proceeds to step 415, where a timing indicator is output for inclusion in the trace stream, this timing indicator providing an interval count. Accordingly, a count of one will indicate that one of the processing timing intervals has elapsed, a count of two will indicate that two of the processing timing intervals have elapsed, etc, this interval count being with respect to the last time a timing indicator was output in the trace stream. Thereafter, at step 420, the process may be arranged to optionally output in addition an indication of the current cycle count, in an analogous manner to that described with reference to step 315 of FIG. 5. Hence, by way of example, if the event of interest detected at step 410 occurs twenty cycles after the last timing indicator was produced, and assuming the current processing timing interval is eight cycles, then the combination of steps 415 and 420 may result in a timing indicator being output at step 415 identifying the elapse of two processing timing intervals, and then at step 420 a cycle count of four being output.

Following step 420, or directly following step 415 if the option of step 420 is omitted, the interval count is reset at step 425, whereafter the process proceeds to step 430 where it is determined whether the cycle count is greater than or equal to the timing interval. Steps 430, 435, 440 and 445 are analogous to steps 320, 325, 330 and 335 of FIG. 5, with the exception that it will be noted that at step 440 the timing indicator is not generated, but instead the interval count is incremented. Hence in contrast to the approach of FIG. 5, where the timing indicator is output as soon as the cycle count is greater than or equal to the timing interval, in accordance with the technique of FIG. 6, if the cycle count is greater than or equal to the timing interval the interval count is merely incremented, and it is only on occurrence of an event of interest that a timing indicator is actually output.

As shown by the dotted arrow in FIG. 6, in accordance with an alternative embodiment, following step 425, the process could proceed directly to step 445 to reset the cycle count, rather than proceeding to step 430. By such an approach, following the output of a timing indicator at step 415, and any optionally included cycle count at step 420, the cycle count is reset at 445. As a result, the next increment in the interval count will not occur until the current processing timing interval has elapsed following the time at which steps 415 and 420 were performed.

Figure 7:
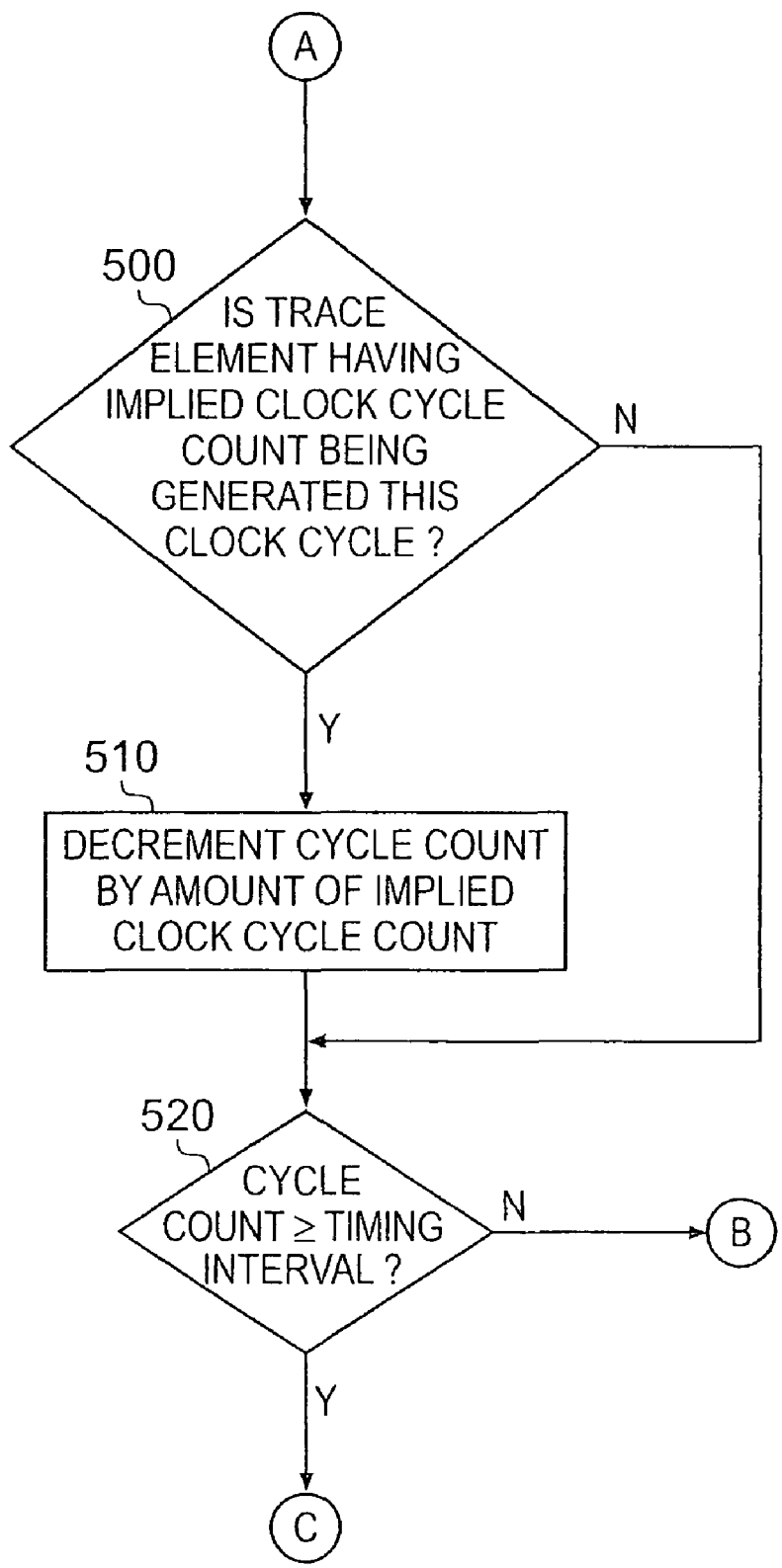
FIG. 7 is a flow diagram illustrating a particular sequence of steps that can be incorporated within the processes of FIG. 5 or FIG. 6 in accordance with an alternative embodiment.

FIG. 7 is a flow diagram illustrating some alternative steps that could be inserted between the points A, B and C in either FIG. 5 or FIG. 6, such that the process of FIG. 7 is in effect a substitute for either step 320 of FIG. 5 or step 430 of FIG. 6. In accordance with the embodiment illustrated in FIG. 7, it is assumed that certain trace elements output in the trace stream will have an implied clock cycle count associated with them. This implied clock cycle count may be predetermined, or alternatively in some embodiments may be programmable, for example by the trace analyser 40. In such a programmable embodiment, the trace analyser 40 may be arranged to store information about the implied clock cycle count for particular trace element types within one or more of the control registers 140, so that that implied clock cycle value can be referenced by the trace generator 120. Whilst in one embodiment, the implied clock cycle count will be a whole number, this is not essential, and accordingly by way of example a particular trace element type may have a cycle count of 1.5 implied. In one particular embodiment, the trace generator is arranged to generate a trace element each time an instruction is executed, and such a trace element has a particular implied clock cycle count associated therewith, for example a single clock cycle.

At step 500, the trace generator 120 determines whether a trace element having an implied clock cycle count is being generated in the current clock cycle. This may be a trace element pertaining to an event of interest, or may alternatively be any other trace element included within the trace stream. If such a trace element is not being generated, the process proceeds directly to step 520, where it is determined whether the cycle count is greater than or equal to the timing interval. However, if at step 500 it is determined that such a trace element is being produced, then at step 510 the cycle count is decremented by the amount of the implied clock cycle count before proceeding to step 520.

Hence, considering FIG. 5 for the sake of illustration, if in one cycle step 325 causes the cycle count to be incremented to eight, and this happens to correspond to the current processing timing interval, then during the next clock cycle, execution of step 320 would cause the process to proceed to step 330 where the timing indicator was generated. However, in accordance with this alternative embodiment, if at step 500 a trace element having an implied clock cycle count of one cycle was determined to be generated, then step 510 would cause the cycle count to be decremented to seven, such that when step 520 was performed, the cycle count would not be greater than or equal to the timing interval, and instead the process would branch to step 325 to cause the cycle count to be incremented without the timing indicator being produced.

Accordingly, by such an approach, the intervals between which the timing indicators are produced can be further extended if trace elements having implied timing are output in the interim, thereby leading to a further reduction in the amount of information that needs to be traced.

Figure 8:
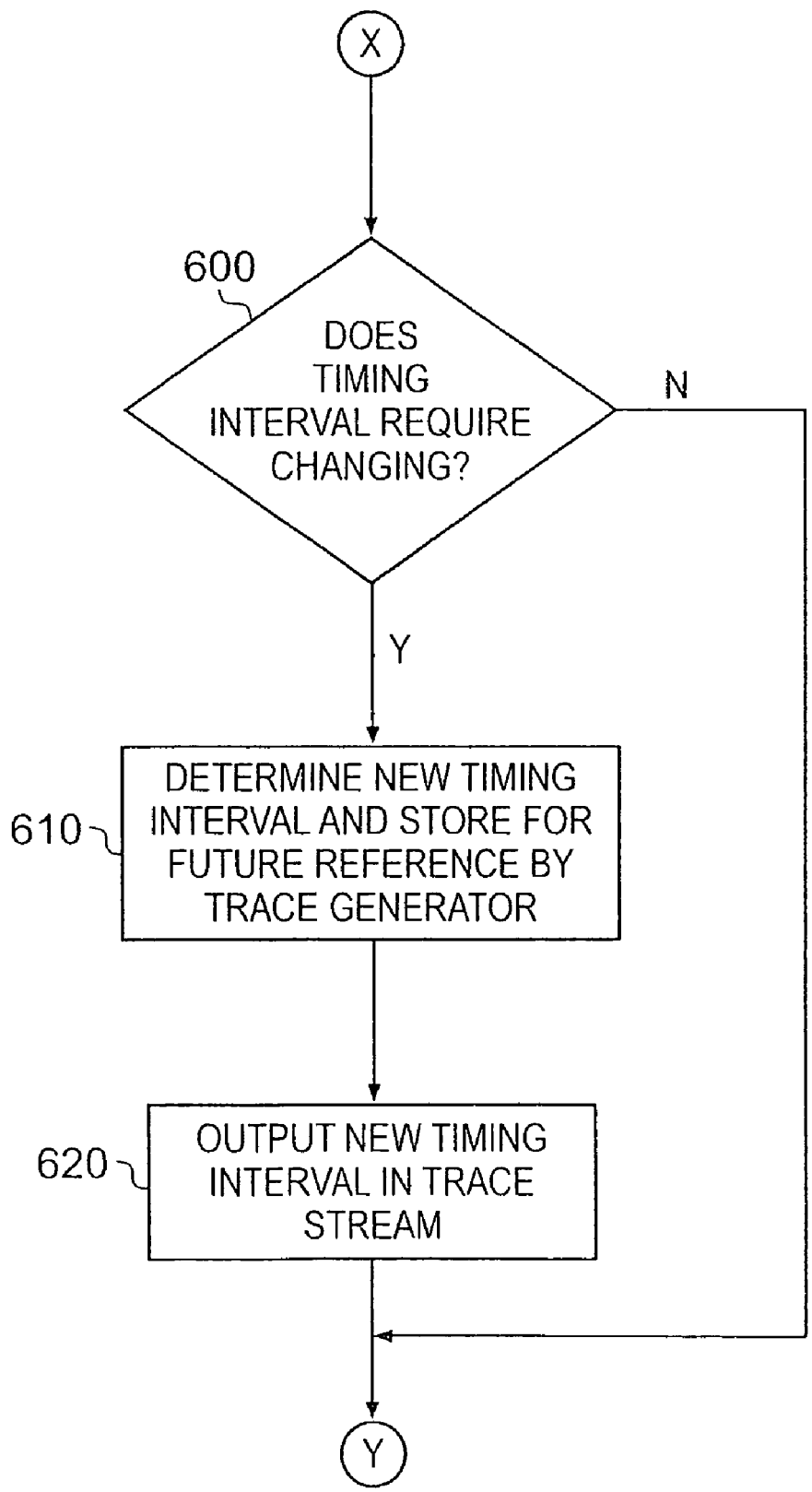
FIG. 8 is a flow diagram illustrating a sequence of steps that may be included within the processes of FIG. 5 or FIG. 6 in accordance with one embodiment of the present invention.

FIG. 8 illustrates an optional sequence of steps that can be inserted between the points X and Y in either FIG. 5 or FIG. 6. In particular, the sequence of steps illustrating in FIG. 8 can be included in embodiments where the trace generator 120 is allowed to dynamically alter the timing interval. As shown in FIGS. 5 and 6, this process can be implemented after outputting a timing indicator, as this represents a point in time where such a change can be implemented without introducing significant complexity. At step 600, it is determined whether the timing interval requires changing. As discussed earlier, this will typically occur as a result of the trace generation logic detecting the occurrence of one or more predetermined events, such as a change in code portion being traced, or as a result of the trace generation logic observing that the frequency of events of interest in the trace stream is significantly less than the frequency with which the current timing interval elapses.

If at step 600 it is determined that the timing interval does require changing, then the process proceeds to step 610, where a new timing interval is determined by the trace generator 120 and stored for future reference (for example in one of the control registers 140). Thereafter, at step 620, the new timing interval is output in the trace stream, so that the trace analyser 40 is advised of the change. If at step 600 it is determined that the timing interval does not require changing, then the process merely proceeds straight to point Y where the process illustrated in FIG. 5 or FIG. 6 continues.

The trace timing indicators generated for inclusion in the trace stream can take a variety of forms. As mentioned previously, the current ETM protocol supports cycle accuracy where the elapse of every single clock cycle is captured and included in the trace stream. In particular, the current ETM protocol outputs a W atom on every processor cycle. These W atoms are output along with other atoms indicating the execution status (E for Executed, N for Not-Executed) for each instruction executed by the processor. Table 1 below shows an example sequence of ARM instructions executed over time. Column D shows how the existing ETM protocol would encode this stream, using 54 atoms to indicate the full execution. A W atom is required for each cycle which passes. In accordance with the configurable processing timing intervals of embodiments of the present invention, the resolution of the cycle accuracy can be changed between a variety of values representing a plurality of clock cycles, and hence for example may take the value of two clock cycles, four clock cycles or eight clock cycles. In such embodiments, the trace timing indicator could take the form of a W atom, but that W atom would then be interpreted by the trace analyser dependent on the current processing timing interval. Accordingly, columns E, F and G show the atom encoding in accordance with such an approach if the cycle accuracy resolution is changed to two, four and eight cycles, respectively.

TABLE 1

| A | B | C | D<br>Current ETM<br>Resolution | E | F | G |
|---|---|---|---|---|---|---|
| | | | | Resolution | | |
| Cycle | Instruction | Atom | 1 | 2 | 4 | 8 |
| 1 | ADD | E | WE | E | E | E |
| 2 | | | W | W | | |
| 3 | ADD | E | WE | E | E | E |
| 4 | SUB | E | WE | WE | WE | E |
| 5 | MUL | E | WE | E | E | E |
| 6 | | | W | W | | |
| 7 | | | W | | | |
| 8 | LDR | E | WE | WE | WE | WE |

TABLE 1-continued

| A | B | C | D<br>Current ETM<br>Resolution | E | F | G |
|---|---|---|---|---|---|---|
| | | | | Resolution | | |
| Cycle | Instruction | Atom | 1 | 2 | 4 | 8 |
| 9 | ADD, MOV | EE | WEE | EE | EE | EE |
| 10 | SUB | E | WE | WE | E | E |
| 11 | MOV | E | WE | E | E | E |
| 12 | MOV | E | WE | WE | WE | E |
| 13 | ADD, CMP | EE | WEE | EE | EE | EE |
| 14 | | | W | W | | |
| 15 | SUBEQ | N | WN | N | N | N |
| 16 | LDR | E | WE | WE | WE | WE |
| 17 | | | W | | | |
| 18 | | | W | W | | |
| 19 | | | W | | | |
| 20 | | | W | W | W | |
| 21 | ADD | E | WE | E | E | E |
| 22 | | | W | W | | |
| 23 | | | W | | | |
| 24 | | | W | W | W | W |
| 25 | SUB | E | WE | E | E | E |
| 26 | MOV | E | WE | WE | E | E |
| 27 | AND | E | WE | E | E | E |
| 28 | CMP, SUB | EE | WEE | WEE | WEE | EE |
| 29 | | | W | | | |
| 30 | | | W | W | | |
| 31 | MOV | E | WE | E | E | E |
| 32 | LDR | E | WE | WE | WE | WE |
| Total Atoms | | | 54 | 38 | 30 | 26 |

As can be seen from Table 1, with a cycle accuracy resolution of two cycles, the sequence of instructions can be encoded using 38 atoms, with a cycle accuracy of four cycles, the same instructions can be encoded using 30 atoms and with a cycle accuracy of eight cycles, the same instructions can be encoded using 26 atoms.

As mentioned previously, once the basic trace elements are produced for inclusion in the trace stream, they are typically subjected to compression techniques in order to reduce the amount of data that needs to output in the stream. The existing ETM protocol encodes the sequences of atoms using run-length encoding methods to compress the amount of trace data which is output. In particular, such trace data is output in byte quantities known as P-headers, with each byte indicating a particular sequence of W, E or N atoms. Table 2 below shows these encodings, which result in 17 bytes of trace being generated for the sequence shown in Table 1:

TABLE 2

| Current ETM p-headers | | |
|---|---|---|
| Format | Meaning | Comments |
| 1 | x*(WE) plus y*(WN) | x is 0-7, y is 0 or 1 |
| 2 | W plus N/E plus N/E | |
| 3 | x*W plus y*E | x is 1-8, y is 0 or 1 |
| 4 | N/E | |

The current ETM protocol relies heavily on the inclusion of one or more W atoms in each byte (except for format 4), and proves efficient when the cycle accuracy resolution is one cycle, as is required by the current system. When using the above described embodiments of the present invention, it would be appropriate to consider restructuring the format of these packets to reduce the weighting of W atoms, since these would typically be output less frequently. It will be appreciated that there are many different encoding techniques that could be produced, but a simple format that could be used is as shown in Table 3 below:

TABLE 3

Example New ETM p-headers

| Format | Meaning | Comments |
|---|---|---|
| 1 | z*W plus x*E plus y*N | z is 0 or 1, x is 0-7, y is 0 or 1 |
| 2 | N/E plus N/E | |

Considering the example of Table 1, such an encoding technique would result in six bytes being generated for a cycle accuracy resolution of eight cycles, ten bytes being generated for a cycle accuracy resolution of four cycles, and eighteen bytes being generated for a cycle accuracy resolution of two cycles. It will be noted that for a cycle accuracy resolution of two cycles, the number of bytes generated is actually greater than the existing ETM protocol, so it would typically be appropriate to consider a different encoding for such a resolution. It will also be appreciated that much more efficient packet schemes are possible, and benchmarking could be used to determine optimum schemes.

As mentioned earlier, a register can be used to store the current processing timing interval. It is conceivable in some embodiments that only a few values would be permitted by a particular implementation, for example a particular implementation may only supports values of 8 or 16.

It is also possible that depending on the chosen processing timing interval, the meaning of the packets could change to provide the most optimum solution. For example, the new format described in Table 3 may be used if the resolution is 8 or 16, but for a lower resolution a different packing scheme could be selected.

Whilst the techniques of embodiments of the present invention have general applicability in tracing applications, they become particularly useful when used in association with complicated traced devices, for example complicated processors which implement out-of-order instruction execution or where data addresses and values are not full-in-order in relation to the instruction stream. In these situations the instruction stream may be buffered to enable the information to be re-ordered (since compression of in-order instructions is much more effective and easier than in out-of-order situations). In these situations, the buffering would not hold all the cycle information relating to the precise execution of the instructions, so single-cycle accuracy does not precisely indicate the execution of instructions. However, by using the above described techniques of embodiments of the present invention, the cycle accuracy can be controlled to maintain the profiling capabilities of trace, without the high overhead and potentially misleading information provided by single-cycle accuracy.

The techniques of embodiments of the present invention can also be usefully applied in relation to systems where it is required to correlate multiple trace streams. The multiple trace streams may relate to different processing devices being traced, or may relate to different parts of trace, for example instruction trace and data trace, for which separate streams may be produced. A chip-wide time-stamping mechanism such as described in commonly-assigned U.S. Pat. No. 7,069,176 can be used to correlate these multiple trace streams, for example to correlate multiple trace streams from multiple processors in multiple clock domains. However, this correlation is likely to only occur every 1000 cycles or more due to the overhead of outputting this information. However, when such a technique is combined with the above described techniques of embodiments of the present invention, then the trace analysis tools can sub-divide the window of 1000 cycles to achieve a much finer level of correlation between the processors. This can be very important in a variety of situations. For example, when undertaking performance monitoring, where two processors in a shared-memory system might be performing memory intensive tasks at the same time, such correlation allows visibility of this problem and allows the programmer to modify the code to avoid bus contention. As another example, when debugging shared memory, a user of the analyser tool can see how a shared memory system is accessed, and in particular the finer level of correlation supported by the techniques of embodiments of the present invention allows debugging of read/write hazards and memory corruption.

As is clear from the earlier description, there are a number of different ways in which the trace timing indicators can be generated for inclusion in the trace stream. The following text provides a series of example implementations that could be used. In the following examples, the predetermined plurality of clock cycles constituting the chosen processing timing interval is 8 clock cycles (with the exception of example 5 where the timing interval is changed part way through), and hence each W atom in the trace indicates that 8 cycles have passed (one trace timing interval).

Example 1a

Table 4 below illustrates this example. In this example events A and B are events of interest and the cycle count is reset at events of interest.

TABLE 4

| Cycles | Trace without timing | Trace with timing |
|---|---|---|
| 0 | | W |
| 4 | Event A | Event A |
| 8 | | |
| 12 | | W |
| 16 | | |
| 20 | | W |
| 24 | | |
| 26 | Event B | Event B |
| 28 | | |
| 32 | | |
| 34 | | W |

Between 16 and 24 cycles have passed between Events A and B.

Example 1b

Table 5 below illustrates this example. In this example the cycle count is NOT reset at events of interest.

TABLE 5

| Cycles | Trace without timing | Trace with timing |
|---|---|---|
| 0 | | W |
| 4 | Event A | Event A |
| 8 | | W |
| 12 | | |
| 16 | | W |
| 20 | | |
| 24 | | W |
| 26 | Event B | Event B |
| 28 | | |
| 32 | | W |
| 34 | | |

Between 16 and 32 cycles have passed between Events A and B. This has larger error-bars at each event of interest than does Example 1a, but is a true heartbeat.

Example 2

Table 6 below illustrates this example. Each event of interest includes a cycle count referring to the number of cycles since the last indicator. The cycle count IS reset at the event of interest (this is the optional path on FIG. 5).

TABLE 6

| Cycles | Trace without timing | Trace with timing |
|---|---|---|
| 0 | | W |
| 4 | Event A | 4 cycles since last indicator + Event A |
| 12 | | W |
| 16 | | |
| 20 | | W |
| 24 | | |
| 26 | Event B | 6 cycles since last indicator + Event B |
| 28 | | |
| 32 | | |
| 34 | | W |

Event A occurs 4 cycles after cycle 0. Event B occurs 22 cycles ((2*8)+6) after Event A.

Example 3

Table 7 below illustrates this example. Interval counts are grouped at events of interest. Cycle counts are reset at each event of interest.

TABLE 7

| Cycles | Trace without timing | Trace with timing |
|---|---|---|
| 0 | | |
| 4 | Event A | 1W + Event A |
| 8 | | |
| 12 | | |
| 16 | | |
| 20 | | |
| 24 | | |
| 26 | Event B | 2W + Event B |
| 28 | | |
| 32 | | |

There are between 16 and 24 cycles between Events A and B.

Example 4

Table 8 below illustrates this example. Interval counts are grouped at events of interest and a cycle count is output indicating the number of cycle since the last indicator. Cycle counts are reset at each event of interest.

TABLE 8

| Cycles | Trace without timing | Trace with timing |
|---|---|---|
| 0 | | |
| 4 | Event A | 1W + 4 cycles since last indicator + Event A |
| 8 | | |
| 12 | | |
| 16 | | |
| 20 | | |

TABLE 8-continued

| Cycles | Trace without timing | Trace with timing |
|---|---|---|
| 24 | | |
| 26 | Event B | 2W + 6 cycles since last indicator + Event B |
| 28 | | |
| 32 | | |

At Event A, 4 cycles have passed since the last indicator, putting that indicator at cycle 0. The cycle counter has been reset at cycle 4. At Event B, 22 cycles ((2*8)+6) have passed, so Event B occurs at cycle 26.

Example 5

Table 9 below illustrates this example. Interval counts are grouped at events of interest. Extra counts are output at events of interest to indicate the cycles passed since the last indicator. Cycle counts are reset at each event of interest.

TABLE 9

| Cycles | Trace without timing | Trace with timing |
|---|---|---|
| 0 | | |
| 4 | Event A | 1W + 4 cycles since last indicator + Event A |
| 26 | Event B | 2W + 6 cycles since last indicator + Event B + Interval increased to 32 |
| 150 | Event C | 3W + 28 cycles since last indicator + Event C |
| 32 | | |

At Event A, 4 cycles have passed since the last indicator, putting that indicator at cycle 0. The cycle counter has been reset at cycle 4. At Event B, 22 cycles ((2*8)+6) have passed, so Event B occurs at cycle 26. Event B causes the timing interval size to be changed from 8 to 32 cycles, and this is indicated in the trace stream. Event C is 124 cycles ((3*32)+28) after Event B.

Example 6

Table 10 below illustrates this example. Interval counts are grouped at events of interest. The grouping only occurs at every $2^{nd}$ event of interest, which can be viewed as effectively classifying events of interest as only every other event. Extra counts are output at events of interest to indicate the cycles passed since the last indicator. Cycle counts are reset at each event of interest.

TABLE 10

| Cycles | Trace without timing | Trace with timing |
|---|---|---|
| 0 | | |
| 4 | Event A | 1W + 4 cycles since last indicator + Event A |
| 26 | Event B | Event B |
| 150 | Event C | 18W + 2 cycles since last indicator + Event C |
| 32 | | |

At Event A, 4 cycles have passed since the last indicator, putting that indicator at cycle 0. The cycle counter has been reset at cycle 4. At Event B, only Event B is traced. Event C is 146 cycles ((18*8)+2) after Event A.

Example 7

Table 11 below illustrates this example. Interval counts are grouped at events of interest and a cycle count is output indicating the number of cycle since the last indicator. Cycle counts are reset at each event of interest. Instructions between events imply 1 cycle per instruction.

TABLE 11

| Cycles | Trace without timing | Trace with timing |
| --- | --- | --- |
| 0 | | |
| 1 | | |
| 2 | | |
| 3 | | |
| 4 | Event A | 1W + 4 cycles since last indicator + Event A |
| 8 | Instruction | |
| 9 | Instruction | |
| 10 | Instruction | |
| 11 | Instruction | |
| 12 | Instruction | |
| 13 | | |
| 15 | | |
| 16 | Instruction | |
| 17 | Instruction | |
| 18 | Instruction | |
| 19 | | |
| 20 | | |
| 21 | Instruction | |
| 22 | Instruction | |
| 23 | Instruction | |
| 24 | | |
| 25 | | |
| 26 | Event B | 1W + 3 cycles since last indicator + Event B |

Event B occurs 22 cycles (11+8+3) after Event A.

It will be appreciated from the above description that the embodiments of the present invention reduce the amount of trace data required for cycle accurate trace, additionally giving users the ability to determine the granularity of cycle accuracy as a trade-off against trace data efficiency. The techniques of embodiments of the present invention can also allow the trace stream to be compressed much more efficiently when a lower level of cycle accuracy is required, whilst also allowing the user to increase the granularity if desired at the cost of trace data bandwidth. By lowering eventual trace data bandwidth requirements, this can lower the pin count requirements on devices. The configurability of embodiments of the present invention provides for control over cycle accuracy granularity and enables selection of a more appropriate cycle accuracy mechanism for more advanced processors where buffering might be required to enable the normal trace stream to be output, and single-cycle accuracy is not fully representative of the processor operation. Techniques of embodiments of the present invention also allow effective correlation between multiple trace sources without the large bandwidth requirement for single cycle accuracy.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus, comprising:
logic circuitry configured to produce data elements; and trace logic circuitry configured to produce a stream of trace elements representative of at least some of said data elements, the trace logic circuitry having trace generation logic circuitry configured to generate trace elements for inclusion in said stream, said trace generation logic circuitry further configured to generate trace timing indicators for inclusion in said stream, each trace timing indicator comprising one or more predetermined timing items, each timing item indicating the elapse of a processing timing interval, where said processing timing interval is a plurality of clock cycles, wherein the processing timing interval is configured so that the number of clock cycles indicated by each timing item is dependent upon a current processing timing interval, and a resolution of clock cycle accuracy represented by said trace timing indicators is variable by altering the processing timing interval.

2. The data processing apparatus of claim 1 further comprising storage for retaining the current processing timing interval, and the trace generation logic circuitry is configured to reference said storage in order to determine when to generate each trace timing indicator.

3. The data processing apparatus of claim 2, wherein the trace generation logic circuitry is configured to alter said processing timing interval in response to an occurrence of one or more predetermined events.

4. The data processing apparatus of claim 3, wherein the data elements produced by the logic circuitry are indicative of program code being executed by that logic circuitry, the trace generation logic circuitry has one or more control registers programmed to identify different processing timing intervals to be used for trace elements generated in respect of different code portions, and the trace generation logic circuitry is configured to alter said processing timing interval dependent on which code portion trace elements are being generated in respect of.

5. The data processing apparatus of claim 3, wherein the trace generation logic circuitry is provided with control information identifying one or more events of interest, and is configured to alter said processing timing interval based on analysis of the frequency with which said events of interest are occurring.

6. The data processing apparatus as claimed in claim 2, wherein when the processing timing interval is changed, the trace generation logic circuitry is configured to include within the stream a timing change indicator indicating the change.

7. The data processing apparatus of claim 1, wherein said trace generation logic circuitry is configured to output said trace timing indicator in said trace stream after each processing timing interval.

8. The data processing apparatus of claim 1, wherein said trace timing indicator indicates the number of said predetermined plurality of clock cycles.

9. The data processing apparatus of claim 1, wherein the trace generation logic circuitry is provided with control information identifying one or more events of interest, and is configured to suppress the output of a trace timing indicator when no event of interest occurs during that processing timing interval.

10. The data processing apparatus of claim 9, wherein said trace generation logic circuitry is configured to output a trace timing indicator indicating the number of processing timing intervals that have elapsed since the output of the previous trace timing indicator when an event of interest occurs.

11. The data processing apparatus of claim 9, wherein the trace generation logic circuitry is configured to suppress the output of a trace timing indicator until a number of events of interest have occurred, and then to output a trace timing indicator indicating the number of processing timing intervals that have elapsed since the output of the previous trace timing indicator.

12. The data processing apparatus of claim 1, wherein the trace generation logic circuitry is provided with control information identifying one or more events of interest, and is further configured, on occurrence of one of said events of interest, to output an additional trace timing indicator indicating the number of clock cycles that have elapsed since the previous trace timing indicator.

13. The data processing apparatus of claim 1, wherein said trace generation logic circuitry is configured to alter said processing timing interval to prevent said trace stream exceeding a bandwidth available to said trace generation logic circuitry.

14. The data processing apparatus of claim 1, wherein said trace generation logic circuitry is configured, when the elapse of a number of clock cycles within a processing timing interval is derivable from said trace elements output in said stream during said processing timing interval, to extend said processing timing interval by said number of clock cycles, such that when the trace timing indicator is subsequently included in the stream, a total number of clock cycles that have elapsed since the output of the previous trace timing indicator is derivable from the number of processing timing intervals indicated by the trace timing indicator in combination with said number of clock cycles derivable from said trace elements.

15. The data processing apparatus of claim 14, wherein the trace generation logic circuitry has one or more control registers programmed to identify, for each of one or more types of trace element, a number of clock cycles to be inferred by that type of trace element, the trace generation logic circuitry being configured to reference said one or more control registers when determining said number of clock cycles by which to extend said processing timing interval.

16. A data processing apparatus as claimed in claim 1, wherein each timing item comprises a timing atom.

17. A data processing apparatus as claimed in claim 1, wherein each timing item comprises a single bit.

18. Trace logic circuitry for generating a stream of trace elements representative of at least some data elements produced by logic circuitry of a data processing apparatus, said trace logic circuitry comprising:
  trace element generation logic circuitry configured to generate trace elements for inclusion in said stream; and
  timing indication logic circuitry configured to generate trace timing indicators for inclusion in said stream, each trace timing indicator comprising one or more predetermined timing items, each timing item indicating the elapse of a processing timing interval, where said processing timing interval is a plurality of clock cycles, wherein the processing timing interval is configured so that the number of clock cycles indicated by each timing item is dependent upon a current processing interval, and a resolution of clock cycle accuracy represented by said trace timing indicators is variable by altering the processing timing interval.

19. A trace analysing apparatus for analysing a stream of trace elements generated by a data processing apparatus, said stream of trace elements including trace timing indicators, each trace timing indicator comprising one or more predetermined timing items, each timing item indicating the elapse of a processing timing interval, each of said processing timing intervals comprised of a plurality of clock cycles, wherein the processing timing interval is configured so that the number of clock cycles indicated by each timing item is dependent upon a current processing interval, the trace analysing apparatus comprising:
  storage circuitry configured to store the current processing timing interval; and
  trace expansion logic circuitry configured to be responsive to receipt of one of said trace timing indicators in said stream to reference said current processing timing interval in order to determine a clock cycle count value to be inserted in said stream.

20. A method of operating a data processing system, comprising the steps of:
  producing data elements;
  employing trace logic for receiving indications of said data elements, and for producing a stream of trace elements representative of at least some of said data elements; and
  generating trace timing indicators for inclusion in said stream, each trace timing indicator comprising one or more predetermined timing items, each timing item indicating the elapse of a processing timing interval, where said processing timing interval is a plurality of clock cycles, wherein the processing timing interval is configured so that the number of clock cycles indicated by each timing item is dependent upon a current processing interval, and a resolution of clock cycle accuracy represented by said trace timing indicators is variable by altering the processing timing interval.

21. A computer program product comprising a non-transitory computer readable storage medium storing a computer program which when implemented on a computer causes said computer to analyse a stream of trace elements, said stream of trace elements including trace timing indicators, each trace timing indicator comprising one or more predetermined timing items, each timing item indicating the elapse of a processing timing interval, each of said processing timing intervals being a plurality of clock cycles, wherein the processing timing interval is configured so that the number of clock cycles indicated by each timing item is dependent upon a current processing interval, by performing the steps of:
  storing the current processing timing interval; and
  on receipt of a trace timing indicator in said stream, referencing said current processing timing interval in order to determine a clock cycle count value to be inserted in said stream.

* * * * *